United States Patent [19]
Epstein

[11] 3,881,254
[45] May 6, 1975

[54] SALIVA EJECTOR

[76] Inventor: Louis C. Epstein, 3813 Westwood Rd., University Heights, Ohio 44118

[22] Filed: Feb. 6, 1974

[21] Appl. No.: 440,074

[52] U.S. Cl. .................................. 32/33; 128/276
[51] Int. Cl. ............................................ A61c 17/04
[58] Field of Search ........ 32/33; 128/240, 241, 276, 128/277, 278, 350, 276

[56] References Cited
UNITED STATES PATENTS

| | | | |
|---|---|---|---|
| 1,116,868 | 11/1914 | Anzelewitz | 32/33 |
| 1,881,415 | 10/1932 | Tingleff | 128/276 |
| 2,130,406 | 9/1938 | Angell | 32/33 |
| 2,574,135 | 11/1951 | Ward | 32/33 |
| 3,476,144 | 11/1969 | Krantz | 32/33 X |
| 3,541,583 | 11/1970 | Deuschle | 32/33 |
| 3,780,740 | 12/1973 | Rhea | 128/276 X |
| R26,470 | 10/1968 | Deuschle et al. | 32/33 |

Primary Examiner—Robert Peshock
Assistant Examiner—J. Q. Lever
Attorney, Agent, or Firm—Isler and Ornstein

[57] ABSTRACT

A saliva ejector is described in which the available suction power is concentrated at a single point and is not diffused. The point of concentration is so positioned as to be directly in contact with the floor of the mouth, where the saliva first pools. To prevent the delicate tissues of the mouth from being drawn into the ejector and thereby clogging the ejector, a minimal amount of atmospheric air is sucked or leaked into the ejector at a point closely adjacent to but removed from the point of intake of saliva, and the area at which said atmospheric air is introduced is protected in a manner to prevent the mouth tissues from being drawn into said area of intake.

13 Claims, 12 Drawing Figures

PATENTED MAY 6 1975 3,881,254

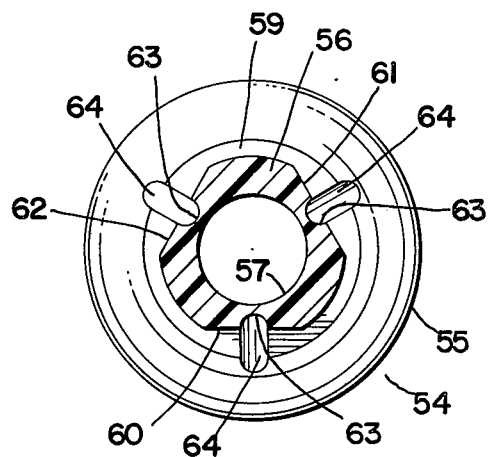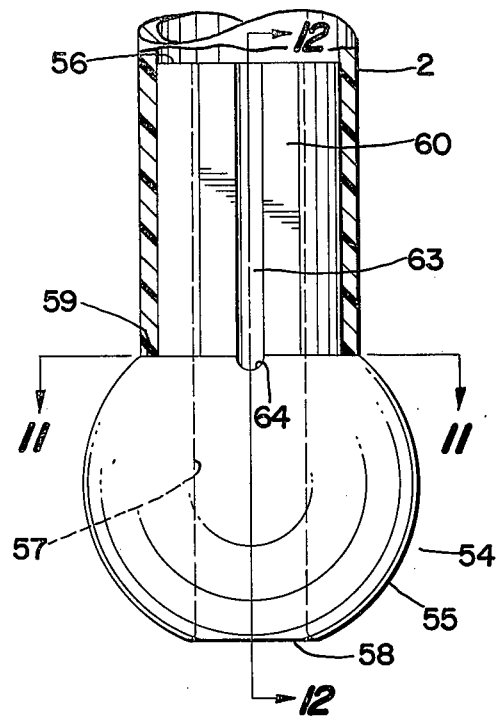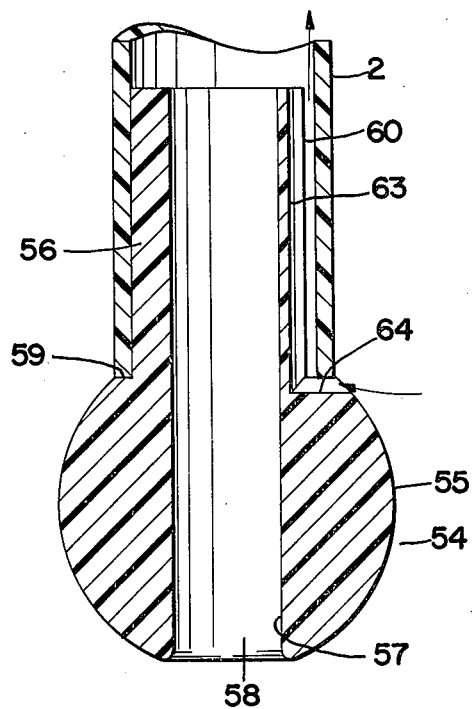
Fig. 11
Fig. 10
Fig. 12

SALIVA EJECTOR

This invention relates generally to saliva ejectors, but has reference more particularly to an ejector having improved suction properties and of greater efficiency than currently available ejectors.

It has heretofore been proposed, as in U.S. Pat. No. 979,290, to provide a saliva ejector comprising a bent suction tube having a spherical end, with two holes or openings at opposite sides thereof, and in which the suction effect was fairly efficient, but which clogged readily, due to the fact that the soft tissues in the floor of the mouth were drawn into these openings.

Attempts were made to correct this defect by incorporating additional holes or vents in the ejector end or head or along the suction tube, as evidenced in a number of patents, examples of which are U.S. Pat. Nos. 1,557,744; 1,012,613; 1,155,020; 1,698,331; 2,130,406; 2,574,135; 2,637,106; 2,742,701 and Re. 26,470.

These, in most cases, prevented clogging, but either reduced the suction effect or diffused the suction effect over a relatively large area, to such an extent as to render the devices highly inefficient for the purposes for which they were intended to be used.

In some cases, as in U.S. Pat. Nos. 1,155,020; 1,698,331; 2,742,701 and Re. 26,470, metal guards of various kinds, springs, and sieve-like tubes were placed over the opening of the suction tube, for the purpose of preventing clogging, but were of such shapes or contours as to feel uncomfortable to the patient, and, at the same time, defeated the primary function or purpose of the ejector, namely, that of eliminating saliva rapidly and efficiently.

In order for these ejectors to work with any degree of efficiency, they had to be virtually submerged in a pool of saliva, but by the time the saliva pooled in the floor of the mouth sufficiently to come into contact with the multiple openings, the saliva was already seeping from the soaked cotton roll in the mouth to the gingival tissues and contaminating the areas on which the dentist was working.

At those times when a rubber dam was used, although the field of operation was maintained in a relatively dry condition, the excessive flow of saliva, especially in young and nervous patients, was such as to exceed the power of the ejector to eliminate it. This caused the lips and outer skin surfaces to become wet and irritated, causing great discomfort to the patient.

The present invention has as its primary object the provision of a saliva ejector of the character described, in which the available suction power is concentrated at a single point, and is not diffused.

Another object of the invention is to provide a saliva ejector of the character described, in which the point of concentration of the suction power is so positioned as to be directly in contact with the floor of the mouth where the saliva first pools.

A further object of the invention is to provide a saliva ejector of the character described having means incorporated therein for preventing the delicate tissues of the mouth from being drawn into the aforesaid point of concentration of the suction power.

A still further object of the inventin is to provide a saliva ejector of the character described, wherein the aforesaid means is so positioned, in relation to the suction tube and suction head, as to prevent such means from being covered or exposed to contact by the tissues of the mouth.

Other objects and advantages of my invention will be apparent during the course of the following description.

In the accompanying drawings forming a part of this specification, and in which like numerals are employed to designate like parts throughout the same, FIG. 1 is a fragmentary view of a saliva ejector embodying the invention;

FIG. 10 is a view similar to FIG. 8, but of still another modified form of the invention, and with a portion of the suction tube broken away to better illustrate the stem construction;

FIG. 11 is a cross-sectional view, taken on the line 11—11 of FIG. 10, and

FIG. 12 is a cross-sectional view, taken on the line 12—12 of FIG. 10.

Figure 1:
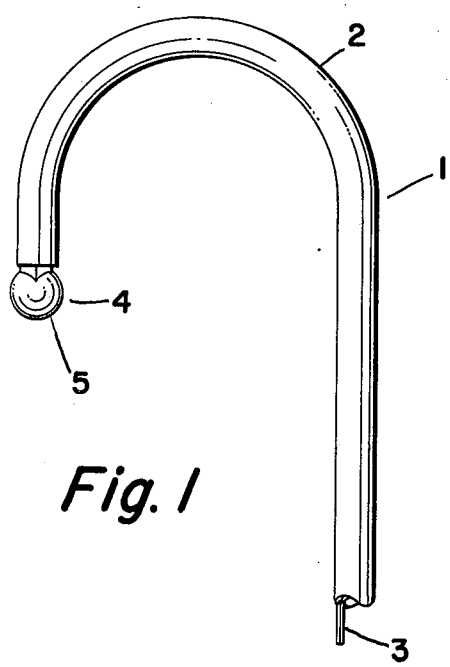
Figure 2:
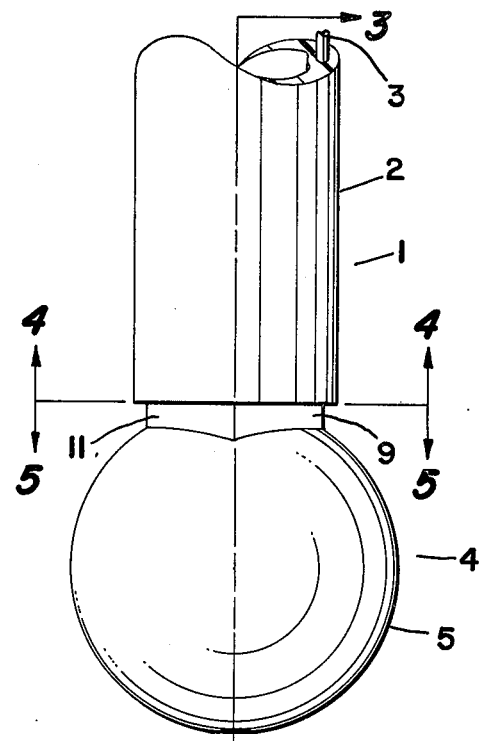
FIG. 2 is a view, on a greatly enlarged scale, of a portion of the saliva ejector of FIG. 1.
Figure 3:
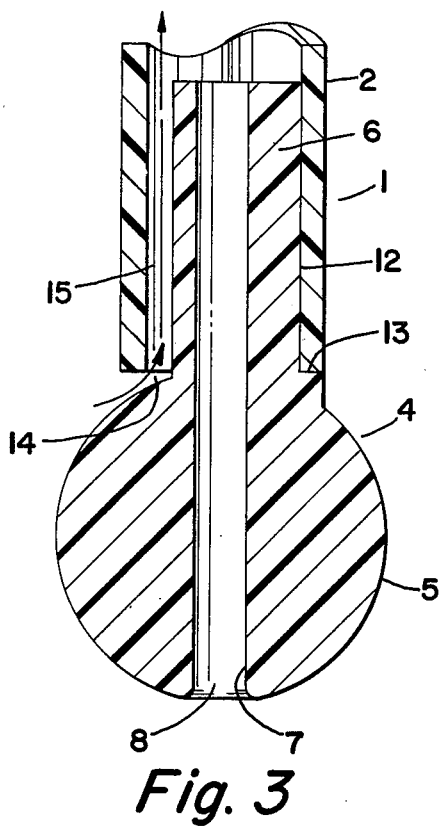
FIG. 3 is a cross-sectional view, taken on the line 3—3 of FIG. 2.
Figure 4:
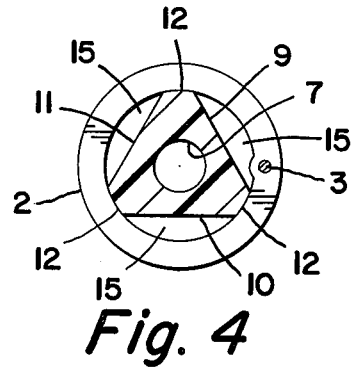
FIG. 4 is a cross-sectional view, taken on the line 4—4 of FIG. 2.
Figure 5:
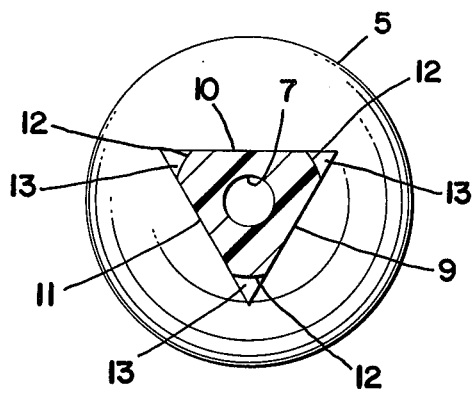
FIG. 5 is a cross-sectional view, taken on the line 5—5 of FIG. 2.

Referring more particularly to FIGS. 1 to 5 inclusive of the drawings, a saliva ejector, designated generally by reference numeral 1, is shown, comprising a length of preferably clear, smooth, soft, light, flexible plastic tubing 2, such as extruded plasticized polyvinyl chloride or polyethylene plastic tubing, having embedded in the wall thereof, a malleable element, such as a soft iron wire 3, extending the length of the tubing 2. This wire serves to retain the tubing in any desired form into which the wire is bent.

Such tubing is available from various sources, and can be bent by the dentist into the form shown in FIG. 1, so that the end portion of the tubing overhangs the patient's jaw with the end of the tubing positioned in the lowermost portion of the patient's mouth.

The lower or proximal end of the tubing 2 is adapted to be connected to a source of suction or vacuum, such, for example, as a vacuum pump (not shown).

Secured to the upper or distal end of the tubing 2 is an ejector head or nozzle, designated generally by reference numeral 4.

The ejector head or nozzle 4 is preferably molded of a thermosetting resin or plastic material, and comprises a spherical portion 5 and a stem or extension 6, which extends radially from the top of the portion 5 and is adapted to be inserted into the lower end of the upper or distal end of the tubing 2, for the purpose of frictionally securing the ejector head to the tubing.

The ejector head or nozzle 4 is provided with a single passageway 7, preferably of circular cross-section and of relatively small diameter, which extends diametrically through the portion 5 and axially through the stem or extension 6, and is substantially in axial alignment with the axis of the upper or distal end of the tubing 2. The lower end of the passageway 7 provides an opening 8 through which saliva may be sucked from the floor of the mouth, into the passageway 7, and thence through tubing 2 when suction is applied to the lower or proximal end of this tubing.

By utilizing a head or nozzle having a portion 5 of spherical form, a minimum of contact is effected between the head and the floor of the patient's mouth, and the smoothly rounded surface of the sphere, which is entirely free of projections or protuberances, eliminates discomfort of any nature to the patient.

Moreover, by utilizing a single inlet opening 8 at the bottom of the spherical portion 5 of the head or nozzle, that is to say, at a position where this opening is in contact with the floor of the mouth, the maximum effect of the available suction power is utilized at the point where the saliva accumulates or begins to pool. In other words, the single opening enables the suction power to be concentrated at this point, instead of being diffused, as is the case where multiple openings are provided in the spherical portion of the head or nozzle, which multiple openings create excess leaks in the suction line.

In the absence of the provision of means for preventing clogging of the aforesaid single opening, the opening would become clogged or blocked by the soft tissues of the floor of the mouth, and the ejector would have to be constantly moved to overcome such clogging or blocking. This, in turn, would create additional and unnecessary work for the dentist.

For the purpose of preventing such clogging or blocking, I have provided means for introducing or leaking into the suction line a minimum amount of atmospheric air, this leakage being so slight as to reduce the effective suction by a minimal extent, so that the suction efficiency provided by the aforesaid single opening is maintained at all times during use of the ejector.

For this purpose, the stem or extension 6 has an exterior surface in the form of an equilateral triangle having sides 9, 10 and 11, which extend upwardly from the surface of the spherical portion 5 of the head. Up to a horizontal level or plane which is substantially tangential to the sphere and is perpendicular to the axis of the passageway 7, the corners formed by the sides 9, 10 and 11 are relatively sharp. Above this plane, the corners formed by the sides 9, 10 and 11 are rounded, as at 12, so that ledges or shoulders 13 are formed or provided, which act as stops to prevent the tubing 2 from coming into abutment or engagement with the surface of the spherical portion 5 of the ejector head or nozzle, when the stem or extension 6 is inserted into the lower end of the tubing and the portion of stem above the aforesaid shoulders is frictionally fitted into the tubing.

By thus preventing the tubing 2 from coming into abutment or engagement with the surface of the spherical portion 5 of the ejector head, a small amount of atmospheric air is permitted to leak into or be sucked into the spaces 14 between the spherical surface and the lower end of the tubing 2, and to pass upwardly into the tubing, through the passageways 15 between the sides 9, 10 and 11 of the stem and the inner surface of the tubing 2.

This leakage is sufficient to render the ejector virtually clogless, while, at the same time, the available suction power is scarcely reduced, so that the ejector is practically as efficient as a non-vented one having a single opening at the contacting surface of the ejector head with the floor of the mouth.

Moreover, since the spaces 14 and passageways 15 are covered or protected by the lower portion of the tubing 2, they cannot be blocked by the mouth tissues or the tongue, so that the saliva ejector, in addition to being practically clogless, is ultra-efficient for its intended purpose.

I have found that, in general, the efficiency of the ejector is in inverse proportion to the degree of leakage or venting and the proximity of the spaces 14 and passageways 15 to the inlet opening 8.

Figure 7:
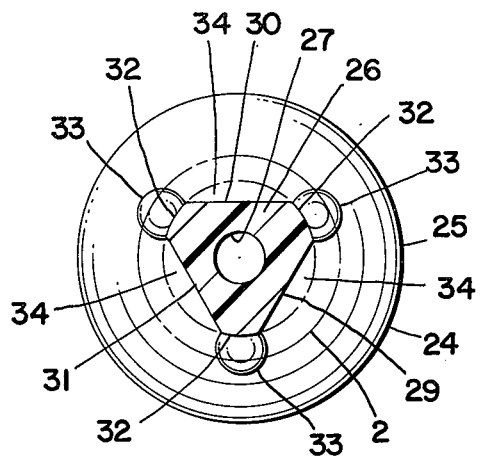
FIG. 7 is a cross-sectional view, taken on the line 7—7 of FIG. 6.
Figure 6:
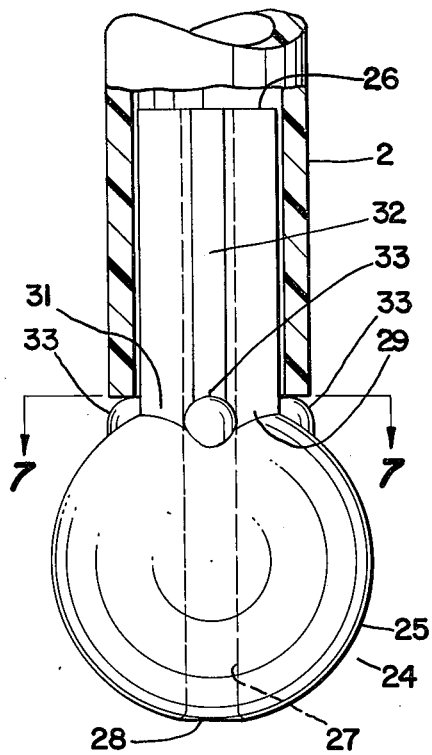
FIG. 6 is a view similar to FIG. 2, but of a modified form of the invention, and with a portion of the suction tube broken away to better illustrate the stem construction.
Figure 9:
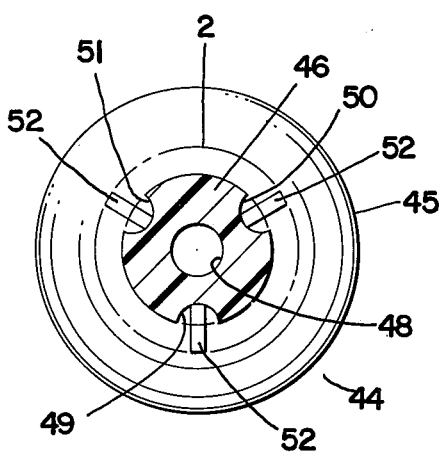
FIG. 9 is a cross-sectional view, taken on the line 9—9 of FIG. 8.

In the modification shown in FIGS. 6 and 7, the ejector head, generally designated by reference numeral 24, comprises a spherical portion 25 and a stem or extension 26, which extends radially from the top of the portion 25 and is adapted to be inserted into the lower end of the tubing 2, for the purpose of frictionally securing the ejector head to the tubing.

The ejector head or nozzle 24 is provided with a single passageway 27, of circular cross-section and of relatively small diameter, which extends diametrically through the portion 25 and axially through the stem or extension 26, and is substantially in axial alignment with the axis of the tubing 2. The lower end of the passageway 27 provides an opening 28 through which saliva may be sucked from the floor of the mouth, into the passageway 27, and thence through the tubing 2 when suction is applied to the other end of the tubing 2.

For the purpose of preventing clogging or blocking of the opening 28, means have been provided for introducing or leaking into the suction line a minimum amount of atmospheric air, this leakage being so slight as to reduce the effective suction by a minimal extent, so that the suction efficiency provided by the aforesaid single opening 28 is maintained at all times during use of the ejector.

For this purpose, the stem or extension 26 has an exterior surface in the form of an equilateral triangle having sides 29, 30 and 31, which extend upwardly from the surface of the spherical portion 25 of the head. The corners formed by the sides 29, 30 and 31 are rounded as at 32 to conform to the inner surface of the tubing 2, to facilitate insertion of and frictional fitting of the extension 26 in the tubing.

For the purpose of preventing the tubing 2 from coming into abutment or engagement with the surface of the spherical portion 25 of the head, small spheroidal elements 33 are provided, which are molded integrally with the head 24, and are disposed adjacent the corners 32 at the base of the stem 26.

This permits a small amount of atmospheric air to leak into or be sucked into the spaces 34 between the lower end of the tubing 2 and the sides 29, 30 and 31 of the stem, and to pass upwardly into the tubing through the passageways between the sides 29, 30 and 31 and the inner wall or surface of the tubing. These passageways correspond to the passageways 15 in that form of the invention shown in FIGS. 1 to 5.

Figure 8:
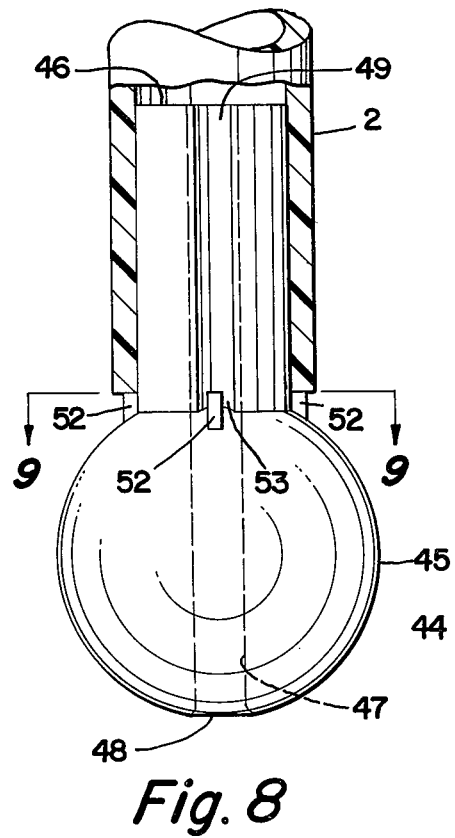
FIG. 8 is a view similar to FIG. 6, but of another modified form of the invention, and with a portion of the suction tube broken away to better illustrate the stem construction.

In the modification shown in FIGS. 7 and 8, the ejector head, generally designated by reference numeral 44, comprises a spherical portion 45, and a cylindrical stem or extension 46, which extends radially from the top of the portion 45 and is adapted to be inserted into the lower end of the tubing 2, for the purpose of frictionally securing the ejector head to the tubing.

The ejector head or nozzle 44 is provided with a single passageway 47, of circular cross-section and of relatively small diameter, which extends diametrically through the portion 45 and axially through the stem or extension 46, and is substantially in axial alignment with the axis of the tubing 2. The lower end of the passageway 47 provides an opening 48 through which saliva may be sucked from the floor of the mouth into the passageway 47 and thence through the tubing 2 when suction is applied to the other end of the tubing 2.

For the purpose of preventing clogging or blocking of the opening 48, means have been provided for introducing or leaking into the suction line a minimum amount of atmospheric air, this leakage being so slight as to reduce the effective suction by a minimal extent, so that the suction efficiency provided by the aforesaid single opening 48 is maintained at all times during use of the ejector.

For this purpose, the cylindrical stem or extension 46 is provided with circumferentially spaced, longitudinally extending channels or grooves 49, 50 and 51, and which extend upwardly from the surface of the spherical portion 45 of the head.

For the purpose of preventing the tubing 2 from coming into abutment or engagement with the surface of the spherical portion 45 of the head, small rectangular blocks or spacers are provided, which are molded integrally with the head 44, and extend from the bottoms of the channels or grooves 49, 50 and 51 radially outwardly beyond the outer surface of the stem 46.

This permits a small amount of atmospheric air to leak into or be sucked into the spaces 53 between the lower end of the tubing 2 and the bases of the channels or grooves 49, 50 and 51 of the stem, and to pass upwardly through the passageways between the inner wall or surface of the tubing 2 and the bottoms of the channels or grooves 49, 50 and 51. These passageways correspond to the passageways 15 in that form of the invention shown in FIGS. 1 to 5.

In the modification shown in FIGS. 10, 11 and 12, the ejector head, generally designated by reference numeral 54, comprises a spherical portion 55, and a cylindrical stem or extension 56, which extends radially from the top of the portion 55 and is adapted to be inserted into the lower end of the tubing 2, for the purpose of frictionally securing the ejector head to the tubing.

The ejector head or nozzle 54 is provided with a single passageway 57, of circular cross-section, and of relatively small diameter in relation to the diameter of the portion 55, which extends diametrically through the portion 45 and axially through the stem 56, and is substantially in axial alignment with the axis of the tubing 2. The lower end of the passageway 57 provides an opening 58 through which saliva may be sucked from the floor of the mouth into the passageway 57 and thence through the tubing 2 when suction is applied to the other end of the tubing 2.

For the purpose of preventing clogging or blocking of the opening 58, means have been provided for introducing or leaking into the suction line a minimum amount of atmospheric air, this leakage being so slight as to reduce the effective suction by a minimal extent, so that the suction efficiency provided by the aforesaid single opening 58 is maintained at all times during use of the ejector.

In this modification, an annular ledge or shoulder 59 is provided on the spherical portion 55 of the head, outwardly of the stem or extension 56, and this ledge or shoulder provides an abutment or seat for the lower end of the tubing 2, as seen in FIGS. 10 and 12.

The cylindrical stem or extension 56 is provided with circumferentially spaced flats or flat sides 60, 61 and 62, each provided with a channel or groove 63, which extends from the upper end of the stem 56 to a point below the level of the shoulder 59, as best seen in FIGS. 10 and 12.

The channel or groove 63 communicates, at its lower end, with a channel or groove 64 which extends through the spherical portion 55 of the head to the outer surface of the portion 55. The channel or groove 64, as best seen in FIG. 12, is disposed just below the lower end of the tubing 2.

In this form of the invention, a small amount of atmospheric air is leaked or sucked into the suction line through the channels 64, channels 63 and the spaces between the flats 60, 61 and 62 and the inner wall of the tubing 2, and thence into the tubing 2.

In all of the modifications which have been described, all of the advantages are obtained that have been described with reference to that form of the invention shown in FIGS. 1 to 5 inclusive.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. A saliva ejector of the character described, comprising a suction tube, an ejector head comprising a spherical portion and a stem extending radially from said spherical portion and frictionally secured within one end of said suction tube, said head having a single suction passageay extending completely diametrically through said spherical portion and axially through said stem, with the axis of said passageway coaxial with said suction tube, and means for aspirating a minimal amount of atmospheric air into the space between said stem and the inner wall of said suction tube.

2. A saliva ejector, as defined in claim 1, wherein said means comprises at least one passageway between the inner wall of said suction tube and the outer wall of said stem.

3. A saliva ejector of the character described, comprising a suction tube having an entry end, an ejector head comprising a spherical portion and a stem extending radially from said spherical portion and frictionally secured within said entry end of said suction tube, said head having a single suction passageway extending diametrically through said spherical portion and axially through said stem, with the axis of said passageway coaxial with the axis of said entry end of said tube, said stem having flat side walls forming with the inner wall of said entry end of said tube passageways for entry of atmospheric air into said suction tube.

4. A saliva ejector, as defined in claim 3, wherein said flat side walls of said stem form corners which are frictionally secured within said entry end of said suction tube.

5. A saliva ejector, as defined in claim 4, including means for supporting the entry end of the suction tube in spaced relation to the surface of said spherical portion of said head.

6. A saliva ejector of the character described, comprising a suction tube having an entry end, an ejector head comprising a spherical portion and a stem extending radially from said spherical portion and frictionally secured within said entry end of said suction tube, said head having a single suction passageway extending diametrically through said spherical portion and axially through said stem, with the axis of said passageway coaxial with the axis of the entry end of said tube, said entry end of said tube being in contiguity with the surface of said spherical portion of said head, said stem having circumferentially-spaced passageways in its outer wall extending from the upper end of said stem to points below the lower end of said entry end of said tube, and passageways below the lower end of said entry end of said tube communicating the lower ends of said spaced passageways with the atmosphere.

7. A saliva ejector, as defined in claim 6, said last-named passageways extending through said spherical portion of said head.

8. A saliva ejector of the character described, comprising a suction tube, an ejector head comprising a spherical portion and a stem extending radially from said spherical portion and frictionally secured within one end of said suction tube, said head having a single suction passageway extending diametrically through said spherical portion and axially through said stem, with the axis of said passageway coaxial with said suction tube, there being a series of circumferentially-spaced passageways between the inner wall of said suction tube and the outer wall of said stem providing means for aspirating a minimal amount of atmospheric air into the space between said stem and the inner wall of said suction tube.

9. A saliva ejector, as defined in claim 8, wherein said spaced passageways are formed as channel-shaped grooves in said stem, and channel-shaped passageways are provided in said spherical portion, which extend from the lower ends of said channel-shaped grooves to the outer surface of said spherical portion of said head.

10. A saliva ejector, as defined in claim 8, including means for spacing the end of said suction tube from the spherical portion of said head, whereby to facilitate entry of said atmospheric air into the lower ends of said spaced passageways.

11. A saliva ejector of the character described, comprising a suction tube, an ejector head comprising a spherical portion and a stem extending radially from said spherical portion and frictionally secured within one end of said suction tube, said head having a single suction passageway extending through said spherical portion and axially through said stem, with the portion of said passageway which extends through said stem coaxial with said suction tube, and means for aspirating a minimal amount of atmospheric air into the space between said stem and the inner wall of said suction tube.

12. A saliva ejector, as defined in claim 11, wherein said means comprises at least one passageway between the inner wall of said suction tube and the outer wall of said stem.

13. A saliva ejector, as defined in claim 11, wherein said means comprises a series of circumferentially spaced passageways between the inner wall of said suction tube and the outer wall of said stem.

* * * * *